Oct. 24, 1950     A. L. SIMISON ET AL     2,527,502
METHOD AND APPARATUS FOR PRODUCING GLASS FIBERS
Filed March 15, 1946     3 Sheets-Sheet 1
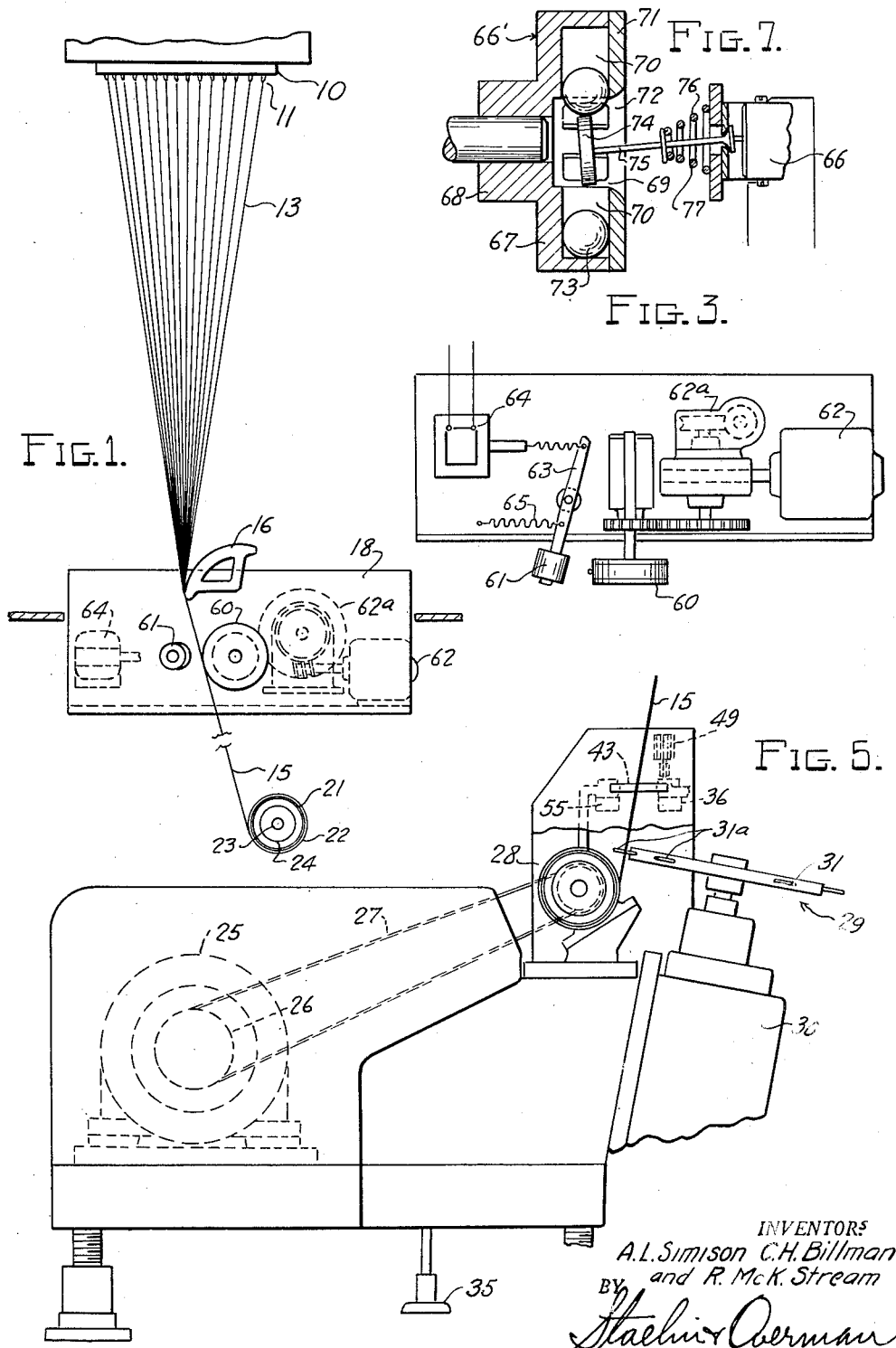
INVENTORS
A. L. Simison, C. H. Billman
and R. McK. Stream
BY
ATTORNEYS Oct. 24, 1950 A. L. SIMISON ET AL 2,527,502
METHOD AND APPARATUS FOR PRODUCING GLASS FIBERS
Filed March 15, 1946 3 Sheets-Sheet 2
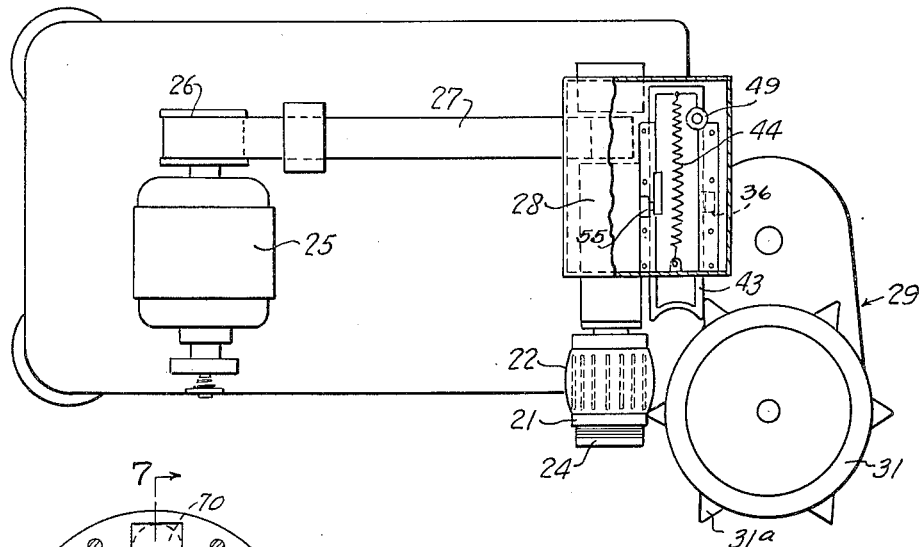
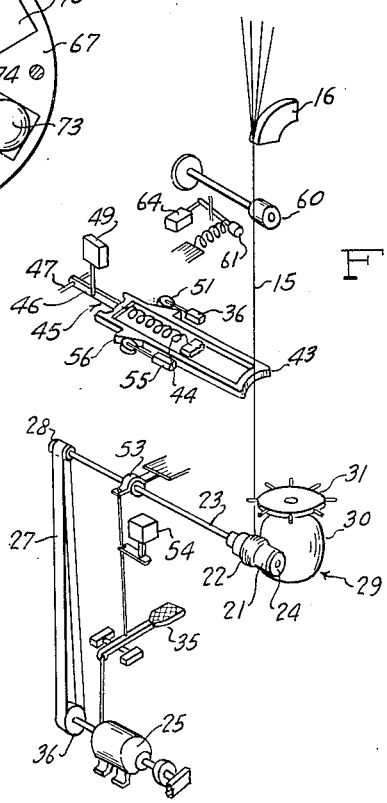
INVENTORS
A. L. Simison C. H. Billman
and R. McK. Stream
BY
ATTORNEYS Oct. 24, 1950      A. L. SIMISON ET AL      2,527,502
METHOD AND APPARATUS FOR PRODUCING GLASS FIBERS
Filed March 15, 1946      3 Sheets-Sheet 3
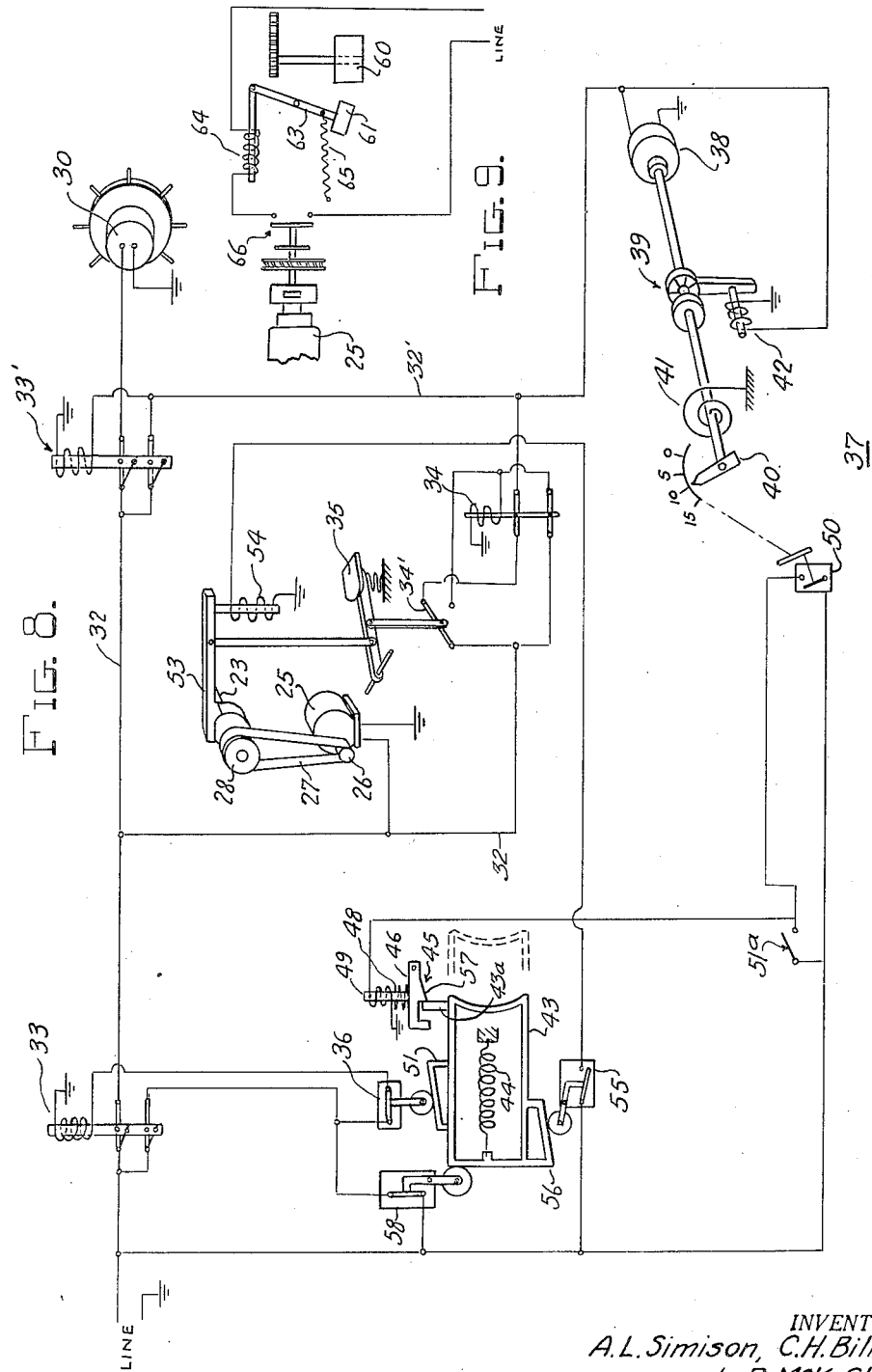
INVENTORS.
A. L. Simison, C. H. Billman
BY and R. McK. Stream
ATTORNEYS Patented Oct. 24, 1950

2,527,502

UNITED STATES PATENT OFFICE 2,527,502

METHOD AND APPARATUS FOR PRODUCING GLASS FIBERS

Allen L. Simison, Charles H. Billman, and Ralph McKelvy Stream, Newark, Ohio, assignors to Owens-Corning Fiberglas Corporation, Toledo, Ohio, a corporation of Delaware Application March 15, 1946, Serial No. 654,650

17 Claims. (Cl. 49—17)

This invention relates generally to an improved method and apparatus for producing glass fibers in strand form.

Glass fibers may be produced by flowing a multiplicity of streams from a feeder containing a supply body of molten glass by the application of a pulling force to the streams sufficient to attenuate the latter into a corresponding number of filaments. The filaments are gathered or grouped to form a strand and the latter is packaged by winding the same on a spool. The spool acts as the attenuating means and is usually rotated at a very high rate of speed. When the required amount of the strand has been wound into a package on the spool, rotation of the spool is discontinued and attenuation is interrupted long enough to permit interchanging an empty spool for the full spool. After the spools have been changed, the glass streams are drawn by hand until the operator starts the winding of the strand onto the spool to initiate the winding operation. Thus attenuation is intermittent and must be started anew after each spool change with the result that much time is consumed getting all of the hundred or more streams of molten glass flowing properly from their source and attenuating properly into fibers.

With the foregoing in view, it is one of the objects of this invention to provide for the attenuation of the molten glass without interruption even during the spool changing operation.

More specifically it is an object to automatically initiate the operation of auxiliary fiber drawing means upon cessation of rotation of the winding spool, the auxiliary means serving to continue drawing out of the glass at a reduced but favorable rate during the interval the spool is replaced with an empty spool.

It is another object of the invention to provide that in association with the control of the auxiliary attenuation the primary attenuation is automatically stopped after a selected period of operation.

Automatically stopping the winding spindle after a predetermined interval of operation relieves the attendant of this responsibility and assures obtaining uniform packages having a specified yardage of glass strand. The provision of means for continuing the fiber drawing operation during the interval the spools are interchanged improves manufacture by eliminating the necessity of constant attention on the part of an operator at the glass feeder and greatly simplifies initiation of the winding operation.

The continued drawing of the fibers during the spool changing period is preferably at a rate much slower than the normal rate of attenuation, so as to simplify and facilitate starting of the winding operation by the attendant. Maintaining a continuous flow of glass from the bushing during the spool changing assists in obtaining a much greater uniformity in operation of the feeder with attendant overall improvement of the operation.

Another object of this invention is to operate the auxiliary fiber drafting means in response to deceleration of the winding spindle. Thus, the auxiliary means is automatically operated to continue drawing glass fibers each time rotation of the spindle is stopped automatically or is stopped manually as is the case when fiber breakage occurs.

Still another object of this invention is to provide means for discontinuing operation of the winding spindle after a predetermined interval of operation, and for shifting the strand of glass fibers being wound to a position beyond one end of the package proper, so that the strand wound during deceleration of the spindle will be separated from the package to permit its ready removal. The importance of this feature will be understood when it is considered that the fibers drawn during deceleration of the spindle are larger in diameter than desired, due to the reduced speed of the winder.

A further object of this invention is to provide for automatic braking of the spindle in timed relation to discontinuing the operation of the power means for the spindle. As a result, rotation of the winding spindle is stopped within a short time after the operation of the power means is discontinued and a correspondingly small amount of strand is wound by the spindle during the deceleration period.

The foregoing as well as other objects will be made more apparent as this description proceeds, especially when considered in connection with the accompanying drawings, wherein:

Figure 1 is a side elevational view of apparatus embodying a part of the invention;

Figure 2 is a schematic prespective view of the apparatus comprising the invention;

Figure 3 is a plan view of the auxiliary fiber drafting means;

Figure 4 is a plan view of the winding means and associated mechanism;

Figure 5 is a side elevational view of the winder shown in Figure 4;

Figure 6 is a sectional elevational view with the cover plate removed of a centrifugal switch in the position it assumes when operation of the winding spindle is interrupted;

Figure 7 is a sectional view of the switch taken on the line 7—7 of Figure 6;

Figure 8 is a schematic wiring diagram of the apparatus; and

Figure 9 is a schematic wiring diagram of the auxiliary fiber drafting apparatus.

Referring now more in detail to the drawings, a conventional feeder 10 adapted to contain a body of molten glass has a multiplicity of discharge orifices in the bottom thereof through which molten glass flows in a corresponding number of streams 11. The glass streams are continuously attenuated at a high rate of speed to form filaments or fibers 13 and the latter are grouped or gathered to form a strand 15 by a guide 16 of conventional kind supported on a frame 18.

The strand 15 is wound about a spool 21 to form a package 22 and the spool is removably held on a driving spindle 23 by a suitable collet 24. The spindle 23 is rotated at a high rate of speed by an electric motor 25 and serves to attenuate the glass streams issuing from the feeder orifices into fine fibers. The drive shaft of the motor 25 projects beyond opposite ends of the motor and a pulley 26 is fixed to one end of the drive shaft for driving the spindle 23 through a suitable belt 27 and pulley 28 on the spindle.

As the strand is wound around the spool 21, it is moved back and forth along the spool to provide a uniform package by the traversing mechanism 29. This mechanism comprises an electric motor 30 and a disk 31 fixed to the motor drive shaft carrying pins 31a in a position to engage the strand 15 at a point above the spool 21. The traverse is preferably of the type shown in the Thomas and Fletcher Patent No. 2,364,569, dated December 5, 1944, and serves to continuously move the strand back and forth along the spool upon rotation of the motor drive shaft in one direction.

The electric motors 25 and 30 are connected in an electric circuit 32 including relays 33 and 33' (Figure 8). The relay 33 controls the winder motor 25 and also controls the operation of the traverse motor 30 through the relay 33'. The coil of the relay 33' is electrically connected in the circuit 32 through a relay 34 controlled by a switch 34' manually operated by a foot pedal 35.

The relay 33 is automatically controlled by a switch 36 connected in the circuit in series with the coil of the relay 33 and operated by the timer mechanism 37 to open the circuit 32. In general the mechanism 37 comprises a clock motor 38 having a drive shaft connected to a dial indicator shaft by a clutch 39. An indicator 40 is fixed to one end of the shaft and is moved by the latter over a dial graduated in a measurement of time. A torsion spring 41 is provided for normally returning the indicator to the zero reading on the dial. The clutch is automatically engaged by a solenoid 42 having its coil connected in the circuit 32 in parallel with the clock motor 38 and in series with the contactors of relay 34 and with the switch 34'.

A slide 43 is normally urged in a direction toward the strand 15 by a spring 44 and is held in spaced relation to the strand 15 by a latch 45. The latch 45 comprises an arm 46 having one end pivoted on a fixed support 47 and having a projection at the opposite end shaped to hook over the outer end of the slide to hold the latter against movement into engagement with the strand 15 by the spring 44. The arm 46 is normally held in engagement with the slide 43 by a spring 48 and is released from the slide by a solenoid 49. The coil of the solenoid is connected in series with a micro-switch 50 embodied in the timing mechanism 37. The switch 50 is closed after the elapse of a predetermined period of time to release the slide and permit movement of the latter in a direction toward the strand 15 by the spring 44. The solenoid 49 or, in other words, the operation of the latch 45 to release the slide may be manually controlled independently of the timing mechanism 37 by a switch 51a, shown in Figure 8 of the drawings as connected in the circuit in parallel with respect to the switch 50 and the contactor coil of the solenoid 49. By this means the operation can be stopped at any time.

The slide 43 has a cam 51 at one side thereof engageable with the switch 36 in the retracted or latched position of the slide to maintain this switch 36 closed. However, movement of the slide 43 in a direction toward the strand 15 under the influence of the spring 44 permits movement of the switch 36 to its open position. Movement of the switch 36 to its open position deenergizes the coil of the relay 33 and opens the latter. As shown in Figure 8 of the drawings, movement of the relay 33 to its open position breaks the circuit 32 with the result that the relays 34 and 33' are also opened. Thus, operation of the winder motor 25, the traversing motor 30, and the clock motor 38 of the timer mechanism is discontinued. Also, the solenoid 42 is deenergized to release the clutch 39 of the timer. Releasing of the clutch 39 permits the spring 41 to return or reset the indicator 40 and open the switch 50 in the timing mechanism 37.

A cycle of operation of the apparatus begins as the operator depresses the brake pedal 35 and manually moves the slide 43 to the retracted position shown in Figure 8. In this position switches 58 and 36 are closed energizing solenoid switch 33 and closing the line contacts. This feeds current into the circuit 32, starting the winder motor 25 and, through switch 34' in its lower position, energizing solenoid switch 34 which is then held in closed position by its hold-in circuit. Releasing the pedal 35 to release the brake and permit the winder spindle to begin rotation causes contact to be made through the upper contact of switch 34' to supply current to circuit 32' thus closing solenoid switch 33' to start the traversing motor 30 and clock motor 38. This also energizes solenoid 42 for engaging the clutch 39. When the predetermined time interval set by the clock 40 is reached the switch 50 closes, thereby energizing solenoid 49 to trip the latch 45 and release the slide 43. Thereupon the slide 43 moves under action of the spring 44 and opens switches 36 and 58, thereby opening switch 33 and stopping the motors 25, 30 and 38. This movement of the slide 43 also applies the spindle brake 53 through switch 55 and solenoid 54. Breaking the circuit at switch 33 also opens the clutch 39 through deenergization of the solenoid 42 to permit the spring 41 to automatically reset the indicator 40 and switch 50 for the next cycle.

In the present instance the spindle 23 of the winder motor 25 is braked to quickly decelerate the spool 21 by a friction type brake 53 operated manually by the foot pedal 35 and also operated electrically by a solenoid 54 having a contactor coil connected in series with an electric switch 55. As shown in Figure 8 of the drawings, the switch 55 is positioned adjacent the slide 43 for operation by a cam 56 carried by the slide and operable in the latched or retracted position of the slide to hold the switch 55 open. Movement of the slide 43 toward the strand 15 under the influence of the spring 44 closes the switch 55. As a result, the solenoid 54 is energized and the brake 53 is applied to stop the spindle 23 or spool 21 at the time the motor 25 is denergized.

In actual practice, it may be desirable to relatively position the cams 51 and 56 so that the relay 33 opens to discontinue the operation of the motors 25 and 30 just prior to closing the switch 55 and applying the brake 53 to the spindle 23. The time interval between opening the switch 50 and closing of the switch 55 is relatively short, however, so that the quantity of the strand wound on the spindle during the deceleration period of the spindle 23 is reduced to a minimum. Inasmuch as the strand is wound or attenuated at a uniform determined rate, it follows that the yardage of the strand wound on the spool may be accurately predetermined by setting the clock mechanism to open the switches 36 and 55 after an interval of operation which will provide the required yardage at the known rate of attenuation or winding. Thus the attendant need not concern himself with this phase of the operation and more uniform packages result.

It is pointed out at this time that movement of the slide by the spring 44 causes the outer end of the slide to engage the strand 15 and move the latter axially of the spool 21 beyond the traversing means 29. Thus, during deceleration of the winding mechanism, the strand is actually wound on the spindle beyond the package where it may be conveniently removed. It is desirable to remove and discard this portion of the strand because it is somewhat larger in diameter than the strand on the spool, due to the reduced rate of attenuation resulting from deceleration of the winding spindle 23. In addition, this feature positions the ends of the strands at the same place in all packages and thereby facilitates locating the ends during subsequent processing of the strands.

When the solenoid 49 is energized in the above manner to release the latch 45, the latch arm is returned to its latching position by the spring 48. Restarting of the apparatus may then be accomplished by merely shifting the slide 43 in an inward direction toward the latch 45. As the slide 43 is shifted in the above direction, a bar 43a (Figure 8) on the outer end of the slide contacts the tapered cam surface 57 on the pivoted latch arm 46 and raises the latter against the action of the spring 48. Upon continued inward movement of the bar 43a, the bar engaging surface on the free end of the latch arm 46 passes over the outer end of the slide 43 and is returned by the spring 48 into latching engagement with the outer end of the slide.

Of course, movement of the slide 43 to its latched position closes the switch 36 and opens the switch 55. Opening of the switch 55 deenergizes the contactor coil of the solenoid 54 and releases the brake 53 from the winder spindle 23. Inasmuch as the switch of the relay 33 is open when the slide 43 is shifted to its latched position, it is necessary to energize the relay contactor coil to close the relay switch before the winder motor 25 is started. As shown in Figure 8 of the drawings, a limit switch 58 shunts the relay switch 33 and is closed by the slide 43 as it approaches its latch position. The switch 36 and contactor coil of the relay 33 are connected in series with the limit switch 58, so that when both the switches 36 and 58 are closed, the relay 33 is closed to start the winder motor 25.

After the winder motor 25 is started in the above manner, the operator manipulates the foot pedal 35 to manually close the relay switch 34, which in turn, closes the relay 33' to start the operation of the traversing motor 30. Closing of the switch 34 also starts the clock motor 38 and energizes the solenoid 42 to engage the clutch 39 and thereby connect the indicator 40 of the timing mechanism 37 to the clock motor 38. It is pointed out at this time that the circuit 32 may be manually controlled independently of the timing mechanism 37 by manipulating the normally open switch 51.

It is a further important feature of this invention to continue drafting the fibers while the winder is inoperative. The fibers are drawn during this period at a rate considerably less than the normal rate of attenuation. While the rate of drawing the fibers during the period of rest of the winder is not critical, nevertheless, particularly satisfactory results have been obtained by drawing the fibers at several hundred feet per minute. This rate of drawing fibers is exceedingly low in comparison with normal attenuating speeds of from 5,000 to 10,000 or more feet per minute but it is sufficient to prevent breakage of the fibers at the feeder during the shut-down period of the winder while being slow enough to enable the attendant at the winder to easily start the winding of the package on the spool and without the assistance of a second attendant at the feeder.

With the above in view, reference is now made to Figures 1 to 3, 6 and 7 of the drawings, wherein it will be noted that the reference characters 60 and 61 indicate a pair of rolls respectively rotatably mounted on the support 18 at opposite sides of the strand 15. The roll 60 is spaced slightly from the adjacent side of the strand and is rotated in the direction of movement of the strand by a motor 62 through suitable reduction gearing 62a. The cooperating roll 61 is rotatably supported on one end of an arm 63 having the opposite end operatively connected to a solenoid 64. The arm is pivoted intermediate the ends on the support 18 and is normally urged in a direction to disengage the roll 61 from the strand by a spring 65.

The coil of the solenoid is connected in an electric circuit (Figure 9) with a switch 66 and the latter is operated in response to deceleration of the spindle 23 and motor 25 to close the circuit to the solenoid. For accomplishing this result, a centrifugally operated device 66' is mounted on the drive shaft of the winder motor 25. This device comprises a cylindrical member 67 having a hub 68 fixed to the motor shaft and having a central bore 69. A plurality of recesses 70 extend radially outwardly from the bore in communication with the latter and are closed by a plate or cap 71 having an opening 72 registering with the central bore 69. The recesses are spaced equal distances from each other circumferentially of the member and form retainers for suitable balls 73. The arrangement is such that when the winder motor 25 is in operation, the balls are held against the outer walls of the recesses 70 by centrifugal force, but as soon as the circuit to the motor is opened and the drive shaft decelerates, the balls fall inwardly toward the axis of rotation of the member 67.

As the balls are displaced inwardly, they engage a disk 74 located in the bore 69 and connected to the inner end of a rod 75. The rod 75 projects through the opening 72 in the cover plate 71 and engages the switch 66. A coil spring 76 surrounds the outer end portion of the rod with one end abutting an enlargement 77 on the rod and with the opposite end engaging the adjacent wall of the switch 66. This spring normally holds the rod centered with respect to the axis of rotation of the member 67 and maintains the switch in its open position.

It follows from the above that as the winder motor shaft decelerates, the balls drop into contact with the disk 74 and tilt the rod 75 against the action of the centering spring 76. This action of the rod closes the switch 66 and energizes the solenoid 64. Energization of the solenoid 64 swings the roll 61 toward the cooperating driven roll 60 and frictionally clamps the strand therebetween. By this time, the winder motor 25 is no longer operating to draw the strand so that continued drafting of the strand is effected at a relatively slow rate by the coacting rolls 60 and 61.

The strand is drafted at the relatively slow rate by the auxiliary mechanism previously described, while the operator removes the spool with the completed package thereon and secures an empty spool on the spindle 23. When these operations are completed, the operator shifts the slide 43 to its retracted or latched position with one hand and grasps the strand with the other hand. As stated above, shifting the slide to its latched position operates the switch 36 to close the relay 33 and start the motor 25. As the spool 21 is rotated by the motor 25, the operator initiates the winding operation by wrapping the strand several times around the spool. In order to facilitate this manual operation, the speed of the spool may be checked to some extent by manipulating the brake pedal 35 to apply the brake 53.

At the instant the winder motor 25 is started, the balls 73 are displaced outwardly in their respective recesses 70 by centrifugal force and the spring 76 operates to again center the rod 75. Centering of the rod 75 opens the switch 66 and the solenoid 64 is deenergized. As a result, the spring 65 again becomes effective to shift the roll 61 in a direction away from the cooperating driving roll 60 to release the strand from both rolls.

We claim:

1. Apparatus for producing fibrous material comprising a rotatable member about which a strand of fibers is adapted to be wound in the form of a package, an electric circuit including power means for rotating said member, means for directing a substantially continuous strand to the rotatable member, means engageable with the strand including a slide supported between the rotatable member and strand directing means for movement parallel to the axis of rotation of said member, means for moving the slide in a direction to engage the same with the strand and to move said strand axially of the rotatable member and out of alignment with the package thereon, and a switch in said circuit operable by movement of the slide in said direction to deenergize said power means and stop rotation of said member.

2. Apparatus for producing glass fibers in strand form, comprising a rotatable member, power means for rotating the member at a relatively high rate of speed, a spool mounted on said member for rotation therewith as a unit and about which a strand of glass fibers is adapted to be wound, a shift bar engageable with the strand in advance of the spool for shifting the strand axially of and out of contact with the spool, an electric circuit, and a switch in said circuit responsive to the operation of the strand engaging bar to deenergize said circuit to discontinue the operation of the power means.

3. Apparatus for producing glass fibers in strand form, comprising a rotatable member, power means for rotating the member at a relatively high rate of speed, a spool mounted on said member for rotation therewith as a unit and about which a strand of glass fibers is adapted to be wound, traversing means for moving the strand back and forth along the spool to provide a package, a brake for the rotatable member, an electric control circuit, a shift bar engageable with the strand in advance of the spool for shifting the strand axially of and out of contact with the spool, a switch in said circuit operable by movement of the shift bar to deenergize a portion of said circuit to discontinue the operation of the power means, and a second switch in said circuit operable by movement of said shift bar to energize a portion of the circuit to apply said brake.

4. Apparatus for producing glass fibers in strand form, comprising a rotatable member, power means for rotating the member at a relatively high rate of speed, a spool mounted on said member for rotation therewith as a unit and about which a strand of glass fibers is adapted to be wound, strand traversing means for moving the strand back and forth on the spool to form a package, a brake for the rotatable member, means engageable with the strand in advance of the spool for shifting the strand axially of and out of contact with the spool independently of the traversing means, an electrical control circuit, a switch in said circuit operable by movement of the strand engaging means to deenergize a portion of said circuit to discontinue the operation of both the power and traversing means, and a second switch in said circuit operable by movement of the strand engaging means to energize a portion of said circuit and apply said brake.

5. Apparatus for producing glass fibers in strand form, comprising means for flowing a stream of glass, attenuating means for drawing out the stream at a rate sufficient to attenuate the stream to a fine filament, control means for discontinuing the operation of the attenuating means after the lapse of an interval of time, and means operating in timed relation to the control means to continue drawing the stream at a rate less than the said attenuating rate while the attenuating means is inoperative.

6. Apparatus for producing glass fibers in strand form, comprising means for flowing streams of glass, means for attenuating the streams to form fibers including a rotatable member about which the fibers are wound, power means for rotating the member at a fast rate of speed to attenuate the streams into fine filaments, control means responsive to interrupt the operation of the power means after a lapse of a predetermined interval of time, and means operable in timed relation to the control means to continue drawing the streams at a rate substantially less than the rate of attenuation by said power means.

7. Apparatus for producing glass fibers in strand form, comprising means for flowing streams of glass, means for attenuating the streams to form fibers including a rotatable member about which the fibers are wound, power means for rotating the member at a fast rate of speed to attenuate the streams into fine filaments, control means for stopping and starting the rotatable member, and means responsive to deceleration of the rotatable member to continue drawing the glass streams at a rate substantially lower than the rate of attenuation by said power means.

8. Apparatus for producing glass fibers in strand form, comprising means for flowing streams of glass, means for attenuating the streams to form fibers including a rotatable member about which the fibers are wound in strand form, power means for rotating said member at a fast rate of speed to attenuate the streams into fine filaments, means engageable with the strand in advance of the rotatable member for shifting the strand axially of said member and for stopping rotation of the latter, and means operating during the period of rest of the member to continue drawing the glass streams.

9. Apparatus for producing glass fibers in strand form, comprising means for flowing streams of glass, means for attenuating the streams to form fibers including a rotatable member about which the fibers are wound in strand form and rotatable at a fast rate of speed to attenuate the streams into fine filaments, traversing means for moving the strand back and forth along the rotatable member, means engageable with the strand to shift the latter axially of the rotatable member and independently of the traversing means to a position adjacent one end of said member, means operated by the strand engaging means to discontinue the operation of the rotatable member and traversing means, and means responsive to deceleration of the rotatable member to continue drawing the streams at a rate substantially less than the rate of attenuation by said members.

10. The method of producing a glass fiber strand which comprises drawing a plurality of fine glass filaments from molten glass at a fast rate of speed and winding the filaments in strand form on a rotatable spool to provide a package, discontinuing the winding operation after the lapse of a predetermined interval of time, shifting the strand axially of the package and out of alignment therewith so that the strand wound on the spool during deceleration of the latter does not form a part of said package, and continuing to draw out the molten glass at a slower rate of speed independently of said winding operation.

11. The method of producing a glass fiber strand which comprises drawing a plurality of fine glass filaments from a supply of molten glass at a fast rate of speed and winding the filaments in strand form on a rotatable spool to provide a package, interrupting the winding operation after a predetermined period of time, shifting the strand axially of the package and out of alignment therewith so that the strand wound on the spool during deceleration of the latter does not form a part of said package, and independently drawing the filaments at a slower rate of speed during the interval the winding in the spool is interrupted.

12. The method of producing a glass fiber strand which comprises continuously drawing a plurality of fine glass filaments from a supply of molten glass at a substantial rate of speed, continuously winding the filaments in strand form on a rotatable member to provide a package, discontinuing rotation of said member after a predetermined period of time, and shifting the strand axially of the rotatable member to a position beyond one end of the package as rotation of the member is discontinued so that the strand wound during deceleration of the member may be readily removed.

13. The method of producing a glass fiber strand which comprises drawing out molten glass at a rate of speed sufficient to attenuate the molten glass to filaments and winding the filaments in strand form on a rotatable member to provide a package, discontinuing rotation of said member after a predetermined period of time, shifting the strand axially of the rotatable member to a position beyond one end of the package as rotation of the member is discontinued so that the portion of the strand wound on said member during deceleration of the latter may be readily removed, and maintaining sufficient pulling force on the strand during the interval rotation of the member is interrupted to continue drawing filaments from the supply of molten glass at a rate of speed less than said attenuating speed.

14. Apparatus for producing glass fibers in strand form, comprising means for flowing a multiplicity of streams of glass, means for attenuating the streams to form fibers including a rotatable member about which the fibers are wound in strand form to provide a package, a driving member for rotating the attenuating member, means for discontinuing the operation of the driving member to stop rotation of the attenuating member, auxiliary fiber drawing means for continuing drafting the fibers after rotation of the attenuating member is discontinued, and means responsive to rotation of one of the members for rendering said auxiliary means operative and inoperative.

15. Apparatus for producing glass fibers in strand form, comprising means for flowing a multiplicity of streams of glass, means for attenuating the streams to form fibers including a rotatable member about which the fibers are wound in strand form to provide a package, a driving member for rotating the attenuating member, means for discontinuing the operation of the driving member after a lapse of a predetermined interval of time to stop rotation of the attenuating member, auxiliary fiber drawing means for drafting the fibers at a rate substantially slower than the rate of attenuation by said member during the interval operation of the attenuating member is interrupted, and a device rotatable with one of said members and operated by centrifugal force to control the operation of said auxiliary fiber drawing means.

16. Apparatus for producing glass fibers in strand form comprising means for flowing a multiplicity of streams of glass, means for attenuating the streams to form fibers including a rotatable member about which the fibers are wound in strand form to provide a package, a driving member for rotating the attenuating member, means for discontinuing the operation of the driving member to stop rotation of the attenuating member, a pair of rolls supported at opposite sides of the strand for rotation and relatively movable into engagement with the strand to frictionally engage the latter, means for driving one of said rolls, and means for relatively moving the rolls into engagement with the strand in timed relation to discontinuing rotation of the attenuating member.

17. Apparatus for producing glass fibers in strand form comprising means for flowing a multiplicity of streams of glass, means for attenuating the streams to form fibers including a rotatable member about which the fibers are wound in strand form to provide a package, a driving member for rotating the attenuating member, means for discontinuing the operation of the driving member to stop rotation of the attenuating member, a pair of rolls supported at opposite sides of the strand for rotation and relatively movable into engagement with the strand to frictionally engage the latter, means for driving one of said rolls, means for relatively moving the rolls into frictional contact with the strand, and a device rotatable with one of said members and operated by centrifugal force for controlling the operation of said last named means.

ALLEN L. SIMISON.
CHARLES H. BILLMAN.
RALPH McKELVY STREAM.

REFERENCES CITED

The following references are of record in the file of this patent:

UNITED STATES PATENTS

| Number | Name | Date |
|---|---|---|
| 1,822,415 | Niogret | Sept. 8, 1931 |
| 1,898,206 | Niogret | Feb. 21, 1933 |
| 1,935,524 | Schweiter | Nov. 14, 1933 |
| 2,234,986 | Slayter et al. | Mar. 18, 1941 |
| 2,302,715 | Reynolds et al. | Nov. 24, 1942 |
| 2,305,085 | Jacob et al. | Dec. 15, 1942 |
| 2,398,808 | Slayter et al. | Apr. 23, 1946 |